United States Patent [19]
Sparlin

[11] 3,746,095
[45] July 17, 1973

[54] ALKYL BIS(HYDROXYPHENYL)ALKANOATES AND ALDEHYDE CONDENSATION PRODUCTS THEREOF

[75] Inventor: Derry D. Sparlin, Ponca City, Okla.

[73] Assignee: Continental Oil Company, Ponca City, Okla.

[22] Filed: Sept. 21, 1971

[21] Appl. No.: 182,513

Related U.S. Application Data
[62] Division of Ser. No. 87,331, Nov. 5, 1970.

[52] U.S. Cl. .............................................. 166/295
[51] Int. Cl. ............................................ E21b 33/13
[58] Field of Search ........................... 166/294, 295; 260/473 S

[56] References Cited
UNITED STATES PATENTS
3,282,338  11/1966  Walther et al. .................... 166/295
3,123,138  3/1964  Robichaux ......................... 166/295
3,123,137  3/1964  Young et al. ...................... 166/295

OTHER PUBLICATIONS
Farbwerke, Hoechst A., Chem. Abstracts, Vol. 66, 1967, 76580X.

*Primary Examiner*—Marvin A. Champion
*Assistant Examiner*—Jack E. Ebel
*Attorney*—Joseph C. Kotarski et al.

[57] ABSTRACT

Bis(hydroxyphenyl)alkanoic acids and high molecular weight alkanols are converted to novel alkyl bis(hydroxyphenyl)alkanoates which are condensed with alkanals to form novel condensation products which are useful as molding resins, coatings, adhesives, consolidation agents, and the like. Such condensation products can be employed to consolidate an unconsolidated subterranean formation.

4 Claims, No Drawings

ALKYL BIS(HYDROXYPHENYL)ALKANOATES AND ALDEHYDE CONDENSATION PRODUCTS THEREOF

This is a division of application Ser. No. 87,331, filed Nov. 5, 1970.

BACKGROUND OF THE INVENTION

This invention relates to novel alkyl bis(hydroxyphenyl)alkanotes.

The invention also relates to organic polymers formed by the condensation of bis(hydroxyphenyl)alkanoates with alkanals.

The invention further relates to a method for consolidating an unconsolidated subterranean formation employing a condensation product of an alkyl bis(hydroxyphenyl) alkanoate and an alkanal.

Phenolic resins, that is, condensation products of phenolic compounds such as phenol, cresols, and the like with aldehydes, are widely used. Exemplary use categories for such phenolic resins include molding compounds, coatings, resins for grinding wheels, coated abrasives, brake linings, clutch facings, laminates, plywood adhesives, bonded glass wool thermal insulation, bonded organic fiber padding, foundry sand bonding, wood-waste bonding, consolidation agents for unconsolidated subterranean formations, and many others. By the end of 1967 it was estimated that the United States was producing phenolic materials at the rate of one billion pounds per year.

However, prior art phenolic resins are now known to have certain disadvantages. For many applications, materials which have improved strength and stability are highly desirable.

One application wherein improved strength and stability are particularly needed is in the consolidation of unconsolidated subterranean formations as in hydrocarbon producing wells or production stimulation wells. Many of such wells have normal production horizon temperatures in the range of about 90°–150°C, and wells wherein steam or fire flooding is employed often having temperatures in the range of 260°–340°C. Poor strength stability of prior art consolidating resins often leads to early failure of sand control, particularly in high capacity wells wherein great stresses are exerted on the consolidated sand by high fluid flow. Epoxy resins employed to consolidate such formations lose strength rapidly at about 90°C and prior art phenolic resins only maintain their stability to about 150°–200°C. Therefore such prior art materials are normally limited to lower temperature applications, and a great need exists for materials which are useful to consolidate formations and which maintain stability at higher temperatures.

Resins formed as condensation products of aldehydes and alkenyl bis(hydroxyphenyl) alkanoates as disclosed by Greenlee in U.S. Pat. No. 2,933,521 constituted a substantial advance in the art. However, improvement in certain properties of phenolic type resins is still highly desirable for many applications. Thus, improved strength and stability are particularly desirable when phenolic type resins are employed as consolidating agents for unconsolidated subterranean formations.

OBJECTS OF THE INVENTION

One object of the invention is to produce novel alkyl bis(hydroxyphenyl)alkanoates.

Another object is to condense the novel alkyl bis(hydroxyphenyl)alkanoates with alkanals to form condensation resins having improved properties.

A still further object of the instant invention is to consolidate unconsolidated subterranean formations employing condensation products of alkyl bis(hydroxyphenyl)alkanoates and alkanals.

These and other objects and advantages will appear from the following description of the embodiments of the invention, and the most novel features will be particularly pointed out hereinafter in connection with the appended claims.

SUMMARY OF THE INVENTION

In one aspect this invention discloses alkyl bis(hydroxyphenyl)alkanoates as novel compositions of matter.

In another aspect the novel composition of matter, supra, is condensed with an alkanal to form a novel condensation resin.

In still another aspect, the novel alkyl bis(hydroxyphenyl)alkanoates are injected into an unconsolidated subterranean formation and an alkanal is also injected into said formation wherein a resin is formed in situ thereby consolidating the formation.

In still another aspect the novel condensation resins are coated onto particulate matter and the coated particulate matter is injected into subterranean formations.

DESCRIPTION OF THE PREFERRED EMBODIMENT

The bis(hydroxyphenyl)alkanoates of the instant invention can be formed by an esterification reaction of bis(hydroxyphenyl)alkanoic acids and primary alkanols, according to the following respresentation:

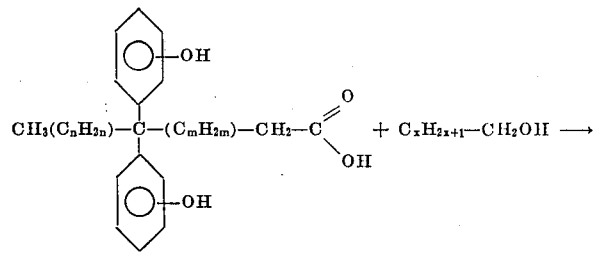

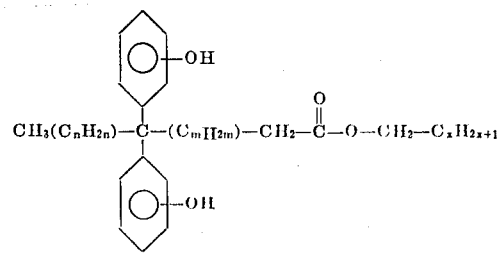

wherein $n$ is 0, 1, 2, or 3, preferably 0 or 1; wherein $m$ is 0, 1, 2, or 3, preferably 0 or 1; wherein $x$ is an integer in the range of 9 to 29, preferably 15 to 21; wherein in each molecule of alkyl bis(hydroxyphenyl)alkanoate, each $n$ is like any other $n$, each $m$ is like any other $m$, and each $x$ is like any other $x$; and wherein each phenolic hydroxyl group is represented as being on any of positions 2 through 6 of its respective benzene ring.

The esterification reaction to form the alkyl bis(hydroxyphenyl)alkanoates of the invention can be conducted by any method known to the art for the formation of an ester from a carboxylic acid and alcohol. Thus, for example, the bis(hydroxyphenyl)alkanoic acid and the primary alkanol can be refluxed in the presence of a suitable water extracting diluent such as toluene, benzene, xylene, and the like and in the presence of a suitable catalytic material such as sulfuric acid, sulfonic acids, and the like for sufficient time to carry out the degree of esterification desired. It is often preferable to follow the course of the reaction by the amount of water of esterification that is produced. This is readily determined by a suitable situated water trap in the liquid reflux return.

The alkyl bis(hydroxyphenyl)alkanoates of this invention also can be synthesized by converting a suitable bis(hydroxyphenyl)alkanoic acid to a respective carboxylic acid halide by reaction with a material such as $SOCl_2$, $PCl_3$, or $PCl_5$, and the like and then reacting the carboxylic acid halide with a suitable primary alkanol.

The bis(hydroxyphenyl)alkanoic acids which are employed can be readily obtained from commercial sources or can be readily synthesized according to the method of Bader et al., Journal of the American Chemical Society, Vol. 76, pages 4465-6 (1954), or as disclosed by Bader in U.S. Pat. No. 2,933,472.

The primary alkanols which are employed can readily be obtained from commercial sources or can be readily synthesized by a number of well known processes. Particularly preferred at present are 1-alkanols having 10 to 30 carbon atoms.

Examples of suitable alkanols include 1-decanol, 1-eicosanol, 1-tricontanol, 1-octadecanol, 3,3-dimethyl-5-ethyl-1-pentadecanol, 6-decyl-1-hexadecanol, and the like, and mixtures thereof.

Suitable bis(hydroxyphenyl)alkanoic acids include 4,4-bis(4-hydroxyphenyl)pentanoic acid, 3,3-bis-(3-hydroxyphenyl)butanoic acid, 6,6-bis(2-hydroxyphenyl)-decanoic acid, 3,3-bis(5-hydroxyphenyl)heptanoic acid, 6,6-bis(6-hydoxyphenyl)heptanoic acid, 4,4-bis(4-hydroxyphenyl)-3,5-dimethylhexanoic acid, the like, and mixtures thereof.

Examples of the alkyl bis(hydroxyphenyl)alkanoates which are formed include eicosyl 4,4-bis(4-hydroxyphenyl) pentanoate, octadecyl 3,3-bis(3-hydroxyphenyl)-butanoate decyl 6,6-bis(2-hydroxyphenyl)decanoate, tricontyl 3,3-bis(5-hydroxyphenyl)heptanoate, 3,3-dimethyl-5-ethyl-1-pentadecyl 6,6-bis(6-hydroxyphenyl)heptanoate, 6-decyl-1-hexadecyl 4,4-bis(4-hydroxyphenyl)pentanoate dodecyl 4,4-bis(4-hydroxyphenyl)-3,5-dimethylhexanoate, octadecyl 4,4-bis(4-hydroxyphenyl)-pentanoate, and the like.

The novel alkyl bis(hydroxyphenyl)alkanoates of this invention are useful for a variety of purposes, but are presently preferably employed to prepare novel condensation resins by condensation with alkanals according to the following representation:

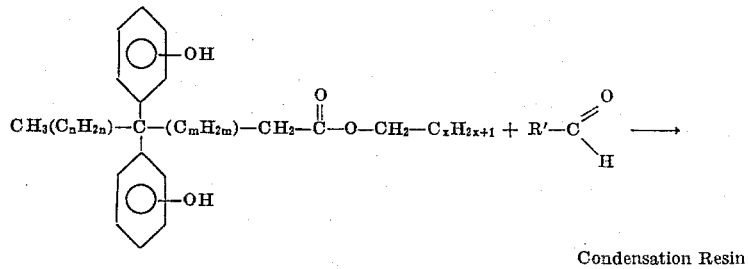

Condensation Resin wherein $x$ is as previously defined; wherein $n$ is 0 to 3, preferably 0 or 1; wherein $m$ is 0 to 3, preferably 0 or 1; wherein in each molecule of alkyl bis(hydroxyphenyl)alkanoate each $x$ is like any other $x$, each $m$ is like any other $m$, and each $n$ is like any other $n$; and wherein $R'$ is hydrogen or an alkyl group having in the range of one to five carbon atoms per alkyl group.

The novel condensation resins of this invention which are prepared from the novel alkyl bis(hydroxyphenyl) alkanoates of this invention can be generally represented by idealized structures thus:

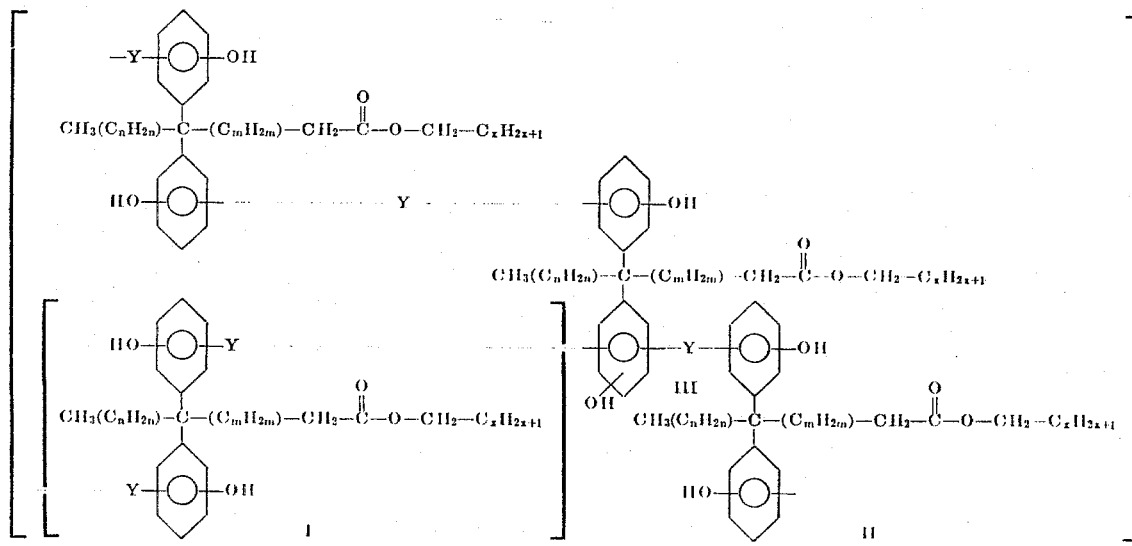

wherein chains represented by the structure II are cross-linked to other chains as represented by structure I at various sites as represented by III to provide cross-linking; and wherein — Y — represents the moiety

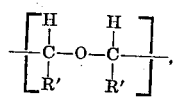

or the moiety

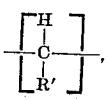

including situations wherein both moieties are present in the same condensation resin in varying proportions.

Included among the novel condensation resins of this invention are completely cured materials wherein sufficient cross-linking is present so that the cured material has thermoset characteristics. Also included among the novel condensation resins of this invention are materials analogous to the so-called novolacs and resoles formed of prior art phenolic compounds and alkanals. In general, the novel organic condensation polymers of my invention comprise those materials wherein a novel alkyl bis(hydroxyphenyl) alkanoate of my invention is employed in lieu of phenol to prepare condensation polymers by any method known to the art for the preparation of condensation polymers of phenol and an alkanal. Disclosure concerning prior art phenolic resins is found in Kirk-Othmer, 2nd, Volume 15, page 176–207; Heslinga and Shores, Journal of Applied Polymers Science, Volume 8, pages 1929–1939, (1964); and Billmeyer, Textbook of Polymer Science, pages 463–469, (1962) Interscience.

Examples of suitable alkanals can include formaldehyde (methanal), acetaldehyde (ethanal), 1-hexanal, 3-methyl-1-pentanal, the like and mixtures thereof.

According to one presently preferred embodiment, resoles are formed in the presence of an alkaline catalyst wherein the mole ratio of alkanal/alkyl bis(hydroxyphenyl) alkanoate is in the range of 0.1 to 2.5, and more preferably in the range of 0.5 to 1.5. The temperature range during the formation of the partially polymerized resole is in the range of 80°C to 200°C, and more preferably in the range of 90°C to 110°C. The components of the resole are normally heated in contact with each other until a viscosity of the resin per se in the range of 20–500 centipoise (cps) is reached at the reaction temperature. Upon reaching the said viscosity, the partially polymerized resin is neutralized and cooled. The cooled material can then be ground into a powder suitable for a molding resin. The time of reaction for forming the resole material is normally in the range of about 10 minutes to 20 days, but more preferably it is usually in the range of about 30 minutes to 2 hours.

According to another presently preferred embodiment, novolacs are formed of the alkyl bis(hydroxyphenyl)-alkanoates of this invention and alkanals in the presence of an acid catalyst in a manner analogous to the manner in which novolacs are formed of prior art phenols and alkanals. In general, a mixture comprising an alkanal and an alkyl bis(hydroxyphenyl)alkanoate of the invention present in a mole ratio of alkanal/alkyl bis(hydroxyphenyl)alkanoate of 0.1 to 1.5 and more preferably in the range of 0.5 to 1.0, are heated in admixture at temperatures roughly in the range of 80°C to 200°C, and more preferably in the range of 90°C to 110°C, until the thus formed partially polymerized resin becomes solidified upon cooling to about 25°C but remains soluble in solvents such as furfuryl alcohol, 2-butoxy-1-ethanol, and benzene. The reaction time until such a stage of condensation is reached is generally in the range of about 10 minutes to about 20 days, but more commonly is in the range of about 30 minutes to 2 hours. The novolac thus formed is then neutralized and cooled. The material can be ground to form a molding powder.

Suitable diluents can be employed in the preparation of the novolacs and resoles of this invention. Such diluents can include any material which is substantially completely nonreactive with the alkyl bis(hydroxyphenyl)-alkanoate and the alkanal under the reaction environment or can include furfuryl alcohol. Examples of particularly preferred materials include furfuryl alcohol, 2-butoxy-1-ethanol, and benzene. Such diluents can comprise in the range of about 1 to 99 weight percent of the reaction mixture.

Subsequent to the formation of the novolac or resole materials of this invention, such materials can be admixed with fillers including such materials as woodflour; silicas including sand, mica, clays, shales and the like; asbestos; and glass including fibers, ground glass, beads, and the like. Other materials can be employed in formulations of the finished molded resin including lubricants such as calcium stearate. Catalytic materials including acid catalysts such as HCl, $H_2SO_4$, phosphoric acid, hypophosphorous acid, toluenesulfonic acid, acetic acid, trichloroacetic acid, No. 12119 acid accelerator (No. 12119 acid accelerator is a product of the Durez Plastics Division of the Hooker Chemical Corp, 2001 Walck Rd., North Tonawanda, N. Y.); basic catalysts including sodium hydroxide, calcium hydroxide, potassium carbonate, and the like; and other accelerating materials including monoethanolamine, triethanolamine, hexamethylenetriamine, hexamethylenetetramine, triethylenetriamine, mono-isopropylamine, phenylethanolamine and the like can be employed. Other components which are known for inclusion with conventional phenolic resins such as calcium hydroxide, gamma-amino-propyltriethoxy silane, diesel fuel, other diluents and the like can also be employed.

According to another presently preferred embodiment, organic condensation polymers of this invention can be formed in situ in unconsolidated underground formations. Such consolidation of unconsolidated subterranean formations is of particular value in hydrocarbon production and secondary production treatments of unconsolidated hydrocarbon bearing formations.

According to still another presently preferred embodiment, partially polymerized condensation resins of this invention are coated onto particulate matter in any manner known to the art for coating a partially polymerized prior art phenolic resin onto particulate matter such as sand. Often, in the range of about 0.25 gallons to 10 gallons of resin are employed for each cubic foot of particulate matter, preferably 0.75 to 2 gallons per cubic foot. The sand or other particulate matter can be injected into fissures of a subterranean formation and polymerization completed in situ in any manner known to the art for in situ hardening of conventional phonolic resins. Subterranean chokes on production or injection wells can also be formed of such materials in the same manner as is known to the art for the forming of chokes and the like employing partially polymerized prior art phenolic resins and the like. The resins of this invention can also be employed to treat subterranean formations in the same manner as prior art resins are employed according to the disclosure of U.S. Pat. No. 2,541,688.

The formations which are referred to in this application as being unconsolidated are to be understood as including poorly consolidated or incompetent formations as well as completely unconsolidated formations.

It should be understood that the above exemplary embodiments are given by way of illustration only and that the organic condensation polymers of this invention which are formed from alkyl bis(hydroxyphenyl)alkanoates and alkanals can be formed and employed in any manner in which condensation polymers of phenols of the prior art and alkanals of the prior art are formed and employed. The novel organic condensation polymers of this invention are distinguished from prior art materials in having unexpectly superior hardness, strength, and stability, particularly at elevated temperatures.

EXAMPLES

Example 1

To a stirred reactor was charged 145 grams of an 1-alkanol mixture comprising largely 1-eicosanol. A total of 143 grams of 4,4-bis(4-hydroxphenyl)pentanoic acid was also charged, and the reactor was heated at a temperature increasing from about 177°C to 306°C over a period of about 25 hours. Water of esterification was trapped, and about 12.5 ml of water was recovered. The product comprised eicosyl 4,4-bis(4-hydroxyphenyl)pentanoate.

This example demonstrates the synthesis of eicosyl 4,4-bis(4-hydroxyphenyl)pentanoate, one of the novel alkyl bis(hydroxyphenyl)alkanoates of the instant invention.

Example 2

The ester product produced in Example 1 was allowed to cool to 100°C, and 150 ml of 37 weight percent formaldehyde was added concurrently with 3 ml of 50 weight percent aqueous sodium hydroxide solution. The resulting mixture was refluxed for one hour at 100°C. A total of 25 ml of water was extracted by refluxing.

The resulting partially polymerized condensation resin was allowed to cool. At 37.8°C it was soluble in the following solvents: furfuryl alcohol, 2-butoxy-1-ethanol, and benzene. It was not soluble in the following solvents at 37.8°C: ethanol, 2-propanol, water, 1-hexanol, 2-methoxy-1-ethanol, methanol, methyl acetate, ethylene glycol, and diesel fuel.

A sample of the partially polymerized condensation resin was heated at 82°C for 24 hours with no reaction. Another 5 ml sample of the said resin was dissolved in 5 ml of furfuryl alcohol and reacted in the presence of 0.2 ml of 12119 acid accelerator (a product of the Durez Plastics Division of the Hooker Chemical Company, 2001 Walck Road, North Tonawanda, New York).

This example demonstrates the preparation of a heat stable condensation resin from an alkanol and an alkyl bis(hydroxyphenyl)alkanoate of the invention.

Example 3

A total of 12.5 ml of the partially polymerized condensation resin of Example 2 was dissolved in 12.5 ml of furfuryl alcohol and slurried with 300 grams of 40–60 U. S. mesh sand, 125 ml of 400 pale oil (a neutral refined oil having 30.0° API gravity, an average molecular weight of 484, a viscosity at 37.8°C of 399.3 SUS and at 100°C of 57.61 SUS, and a pour point of −17.8°C,)1.2 ml of No. 12119 acid accelerator from the Durez Plastics Division of Hooker Chemical Company, and 0.2 ml of gamma-aminopropyltriethoxy silane. The slurry was poured into a poly(vinyl chloride) mold which was ⅞ inch internal diameter and heated to 82°C. Samples were then tested for compressive strength after various times at 82°C with results as shown in the following Table 1.

TABLE 1

| | Days Heated at 82°C. | Average Compressive Strength (psi) |
|---|---|---|
| Inventive Run 1 | 1 | 2200 |
| | 4 | 2300 |
| | 14 | 2542 |
| | 33 | 2608 |
| | 88 | 2660 |

The excellent compressive strength and stability imparted to unconsolidated sand formations by a resin of the instant invention is demonstrated by the above run in comparison to the following comparative runs employing commercial consolidation systems.

For comparison, Control runs 2–4 were made with prior art consolidation systems. In each run 300 grams of 40–60 U. S. mesh sand and 125 ml of 400 pale oil were admixed with materials as presented in the following Table 2, after which the resulting slurries were poured into ⅞ inch internal diameter poly(vinylchloride) tubing molds as with the inventive consolidated material, and heated as noted in Table 2.

TABLE 2

| Other Materials | Days Heated | Average Compressive Strength (psi) |
|---|---|---|
| Control Run 2 — Temp. 72°C | | |
| 25 ml of 80 wt. % 7421A [1] in furfuryl alcohol | 3 | 1104 |
| 5 ml 12119 acid accelerator[2] | 14 | 1173 |
| 0.2 ml gamma-aminopropyl triethoxy silane | 30 | 919 |
| Control Run 3 — Temp. 72°C | | |
| 15.6 ml 80% K70-71 — product of Dow Chemical Co., Midland, Michigan | 3 | 632 |
| | 14 | 480 |
| in ethanol (See U.S. 2,541,688 | 31 | 502 |
| 0.2 ml gamma-aminopropyl triethoxy silane | | |
| Control Run 4 — Temp. 71°C | | |
| 25 ml 33% epichlorohydrin bis phenol A[3] in 2-methoxy-1-ethanol | 2 | 88 |
| | 16 | 361 |
| 5 ml triethylene triamine | 30 | 280 |
| 0.2 ml gamma-aminopropyl triethoxy silane | | |

(1) 7421A is Durez Plastic Divisions designation of a partially polymerized phenol-formaldehyde resin.

(2) 12119 acid accelerator is a product of the Durez Plastics Division of the Hooker Chemical Corp., 2001 North Tonawanda, N. Y.
(3) The epichlorohydrin bis phenol A resin was DER 331 resin from the Dow Chemical Copany of Midland, Michigan, having an epoxide equivalent of 187-193, a mole weight of 350-400, a Gardner-Holt viscosity in 40% butylcarbitol of 11,000-16,000 cps at 25°C.

A sample of the cured slurry of Run 1 was heated in a furnace for 48 hours at 320°C with no visible signs of decomposition.

This example clearly demonstrates the superiority of the condensation resins of the instant invention in consolidated material. Superior compressive strength and good stability of the consolidated material is produced in contrast to prior art materials wherein the poorer compressive strengths deteriorate with time. Suprisingly good heat stability is demonstrated.

Example 4

An oil production well having a production formation which is comprised of unconsolidated sand at the 8865-8869 foot level is consolidated according to the instant invention as follows. The well is perforated through the casing at the 8865-8869 foot level with salt brine in the casing. A tubing and treating tool is run into the hole and the tool is set at 8850 feet with the bottom of the tail pipe at 8870 feet. On the surface, a mixture of 400 gallons of a mixture comprised of 50 weight percent of the resin of Example 2 and 50 weight percent of furfuryl alcohol is prepared. Twenty gallons of No. 12119 acid accelerator[(2)] is blended into the resin and the mixture is prepared for pumping. The following materials are pumped into the formation in sequence: 20 barrels of number 1 diesel fuel; 5 barrels of a mixture comprised of 80 percent number 1 diesel fuel and 20 percent 2-propanol with an added 0.2 percent by volume of gamma-aminopropyltriethoxy silane; 2 barrels of number 1 diesel fuel; the 420 gallons of the resin-accelerator mixture; and 20 barrels of number 1 diesel fuel.

The well is then shut in for approximately 24 hours to allow the plastic to set. The bottom hole temperature is about 82°C at this depth and the plastic and sand mixture sets to a consolidated material having about 2000 psi compression strength after about 24 hours. The well is then put into production, and no sand is produced along with the well fluids.

This example demonstrates consolidation of an unconsolidated subterranean formation according to this invention.

Example 5

A material comprising octadecyl 4,4-bis(4-hydroxyphenyl)pentanoate was produced by reacting an alkanol mixture comprising largely 1-octadecanol with 4,4-bis(4-hydroxyphenyl)pentanoic acid in equal molar amounts according to the procedure of Example 1. In like manner, a material comprising the prior art material, 9-octadecenyl 4,4-bis(hydroxyphenyl)pentanoate, was synthesized from 9-octadecanol and 4,4-bis(4-hydroxyphenyl)pentanoic acid.

Each of the materials was condensed with one mole of formaldehyde per mole of ester by the procedure of Example 2 to form the respective partially polymerized condensation resin. Each material then dehydrated.

Each partially polymerized condensation resin was ground to a fine powder, and then ground for 10 minutes with hexamethyldiamine, calcium hydroxide, woodflour, and calcium stearate according to the recipe of Table 3 to form a uniform blend.

TABLE 3

| Compound Recipe | Parts by Weight | | | |
|---|---|---|---|---|
|  | Run 1 | Run 2 | Run 3 | Run 4 |
| Resin from Saturated Alcohol | 100 | 100 |  |  |
| Resin from Unsaturated Alcohol |  |  | 100 | 100 |
| Hexamethyldiamine | 10 | 20 | 10 | 20 |
| Woodflour | 110 | 120 | 110 | 120 |
| Calcuim Hydroxide | 1 | 1 | 1 | 1 |
| Calcuim Stearate | 1 | 1 | 1 | 1 |

Two inch diameter discs of the compositions of Runs 1, 2, 3 and 4 were formed by compression molding 10 grams of each composition for 5 minutes in a positive pressure mold at 170°C and 5000 pounds force. Barcol hardness tests at 23°C were made on each of these samples. Test specimens of the molded materials of Runs 1 and 3, which were ⅛in. thick, were further compression molded at 170°C and 100 psi for 5 minutes. Flexural strength and modulus were determined for each resulting specimen according to the method of ASTM D 790-66. These data are presented in Table 4 below.

TABLE 4

|  | Run 1 | Run 2 | Run 3 | Run 4 |
|---|---|---|---|---|
| Barcol Hardness | 8 | 20 | 5 | 8 |
| Flexural Strength (psi) | 8500 | Not Determined | 6900 | Not Determined |
| Flexural Modulus (psi × $10^5$) | 5.1 |  | 4.2 |  |

This example demonstrates that condensation resins derived from alkyl bis(hydroxyphenyl)alkanoates have surprisingly superior hardness, flexural strength, and flexural modulus as compared to analogous condensation resins derived from prior art alkenyl bis(hydroxyphenyl)-alkanoates.

Example 6

A series of runs are carried out wherein exemplary alkyl bis(hydroxyphenyl)alkanoates of the invention are prepared from exemplary alkanols and bis-(hydroxyphenyl)alkanoic acids.

1-Octadecanol and 3,3-bis(3-hydroxyphenyl)butanoic acid are converted to octadecyl 3,3-bis(3-hydroxyphenyl) butanoate.

1-Decanol and 6,6-bis(2-hydroxyphenyl)decanoic acid are converted to decyl 6,6-bis(2-hydroxyphenyl)-decanoate.

1-Tricontanol and 3,3-bis(5-hydroxyphenyl) heptanoic acid are converted to tricontyl 3,3-bis(5-hydroxyphenyl)heptanoate.

3,3-Dimethyl-5-ethyl-1-pentadecanol and 6,6-bis(6-hydroxyphenyl)heptanoic acid are converted to 3,3-dimethyl-5-ethyl-1-pentadecyl 6,6-bis(6-hydroxyphenyl)heptanoate.

6-decyl-1-hexadecanol and 4,4-bis(4-hydroxyphenyl)pentanoic acid are converted to 6-decyl-1-hexadecyl 4,4-bis(4-hydroxyphenyl)pentanoate.

1-Dodecanol and 4,4-bis(4-hydroxyphenyl)-3,5-dimethylhexanoic acid are converted to dodecyl 4,4-bis(4-hydroxyphenyl)-3,5-dimethyl hexanoate.

This series of runs demonstrates the generic scope of the alkyl bis(hydroxyphenyl)alkanoates which are synthesized according to this invention.

Example 7

A series of runs are carried out wherein exemplary alkyl bis(hydroxyphenyl)alkanoates are condensed with exemplary alkanals in the presence of exemplary catalysts.

A condensation resin is formed of 3,3-bis(3-hydroxyphenyl)butanoate and 1-hexanal in the presence of a catalytic amount of hydrochloric acid.

A condensation resin is formed of decyl 6,6-bis(2-hydroxyphenyl)decanoate and 3-methyl-1-pentanal in the presence of a catalytic amount of sulfuric acid.

A condensation resin is formed of 3,3-bis(5-hydroxyphenyl)heptanoate and ethanal in the presence of toluenesulfonic acid.

A condensation resin is formed of 6,6-bis(6-hydroxyphenyl)heptanoate and paraformaldehyde in the presence of a catalytic amount of potassium hydroxide.

A condensation resin is formed of 6-decyl-1-hexadecyl 4,4-bis(4-hydroxpheny)pentanoate and formaldehyde in the presence of a catalytic amount hexamethylenetetramine.

A condensation resin is formed of dodecyl 4,4-bis(hydroxyphenyl)-3,5-dimethylhexanoate and propanal in the presence of a catalytic amount of phenylethanolamine.

This series of runs demonstrates the generic scope of the condensation resins formed according to this invention.

I claim:

1. A method of consolidating an unconsolidated subterranean formation comprising:
   a. injecting an alkyl bis(hydroxyphenyl)alkanoate having the formula:

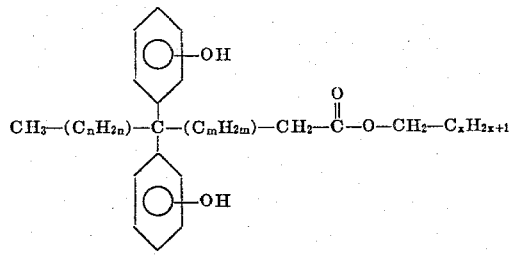

wherein $n$ is 0, 1, 2, or 3; wherein $m$ is 0, 1, 2, or 3; wherein $x$ is an integer in the range of 9 to 29; into an unconsolidated subterranean formation,
   b. injecting about 0.1 to 2.5 moles of an alkanal, having in the range of one to six carbon atoms per molecule, per mole of alkyl bis(hydroxyphenyl) alkanoate into the unconsolidated subterranean formation in admixture with alkyl bis(hydroxyphenyl)alkanoate, and
   c. reacting the alkyl bis(hydroxyphenyl)alkanoate and alkanal to form a consolidating resin in situ.

2. The method of claim 1 wherein the alkyl bis(hydroxyphenyl)alkanoate is a normal-alkyl bis(hydroxyphenyl)alkanoate and the alkanal is formaldehyde.

3. The method of claim 1 wherein the alkyl bis(hydroxyphenyl)alkanoate is eicosyl 4,4-bis(hydroxyphenyl) pentanoate and the alkanal is formaldehyde.

4. A method of consolidating an unconsolidated subterranean formation comprising:
   a. providing a partially polymerized condensation polymer formed by condensation of an alkyl bis(hydroxyphenyl)alkanoate having the formula:

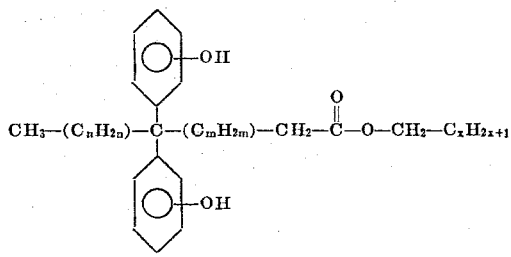

wherein $n$ is 0, 1, 2, or 3; wherein $m$ is 0, 1, 2, or 3; wherein $x$ is an integer in the range of 9 to 29; with an alkanal having the formula R'CHO wherein R' is hydrogen or alkyl having in the range of one to five carbon atoms per alkyl group;
   b. coating particulate matter with the partially polymerized condensation polymer,
   c. injecting the coated particulate matter of (b) into the unconsolidated subterranean formation, and
   d. hardening the partially polymerized condensation polymer.

* * * * *